Sept. 1, 1953
H. N. IPSEN
2,650,944
ELECTRIC HEATING APPARATUS
Filed Oct. 4, 1951
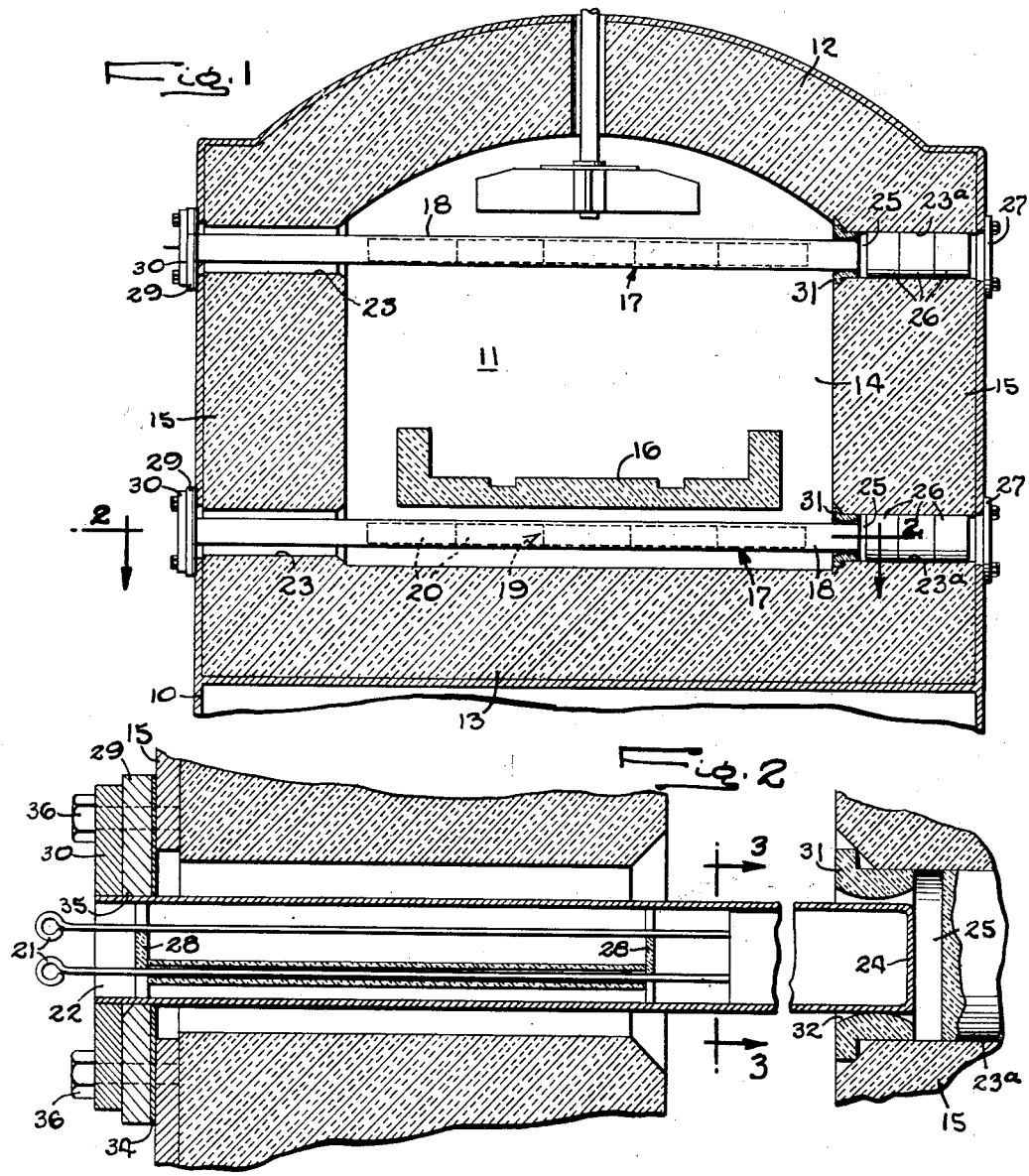
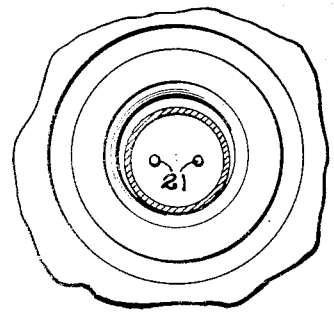
INVENTOR
Harold N. Ipsen
By Carlson, Pitzner, Hubbard & Wolfe
ATTORNEY Patented Sept. 1, 1953

2,650,944

UNITED STATES PATENT OFFICE 2,650,944

ELECTRIC HEATING APPARATUS

Harold N. Ipsen, Rockford, Ill.

Application October 4, 1951, Serial No. 249,767

1 Claim. (Cl. 13—25)

This invention relates to electric furnaces for heat treating metal parts, and the primary object is to provide a furnace and an electric heater therefor in which a high resistance electric heating element is enclosed in a tube which is constructed and mounted in a novel manner to exclude furnace gases from the interior of the tube and to secure the heater firmly in position.

A more detailed object is to form the tube with a closed end which is free to slide relative to the furnace walls during expansion and contraction of the tube and the walls and with an open end which is secured to a wall of the furnace and sealed from the furnace chamber.

Other objects and advantages of the invention will become apparent from the following detailed description taken in connection with the accompanying drawings, in which Figure 1 is a vertical section of a heat treating apparatus incorporating the novel features of the present invention.

Fig. 2 is a sectional view taken along the line 2—2 of Fig. 1.

Fig. 3 is a section taken along the line 3—3 of Fig. 2.

In the drawings, the invention is shown for purposes of illustration in a furnace mounted on a frame 10 and having a heating chamber 11 defined by top and bottom walls 12 and 13, end walls 14 and spaced upright side walls 15. A platform or floor 16 supported on the side walls and spaced above the bottom wall supports workpieces (not shown) to be heated within the chamber. Spanning the side walls and extending at opposite ends into alined holes 23 and 23ª at points spaced along the chamber are one or more electric heaters 17 in the form of tubes 18 of refractory material which enclose heating elements 19. Herein, each heating element comprises a plurality of heating units 20, each of which includes a coil of high resistance, connected together with a terminal one of the units connected to lead wires 21. The heating element terminates short of the tube ends and hence short of the side walls to minimize heating of the latter and the loss of heat therethrough.

In accordance with the present invention, the heaters 17 are constructed in a novel manner to exclude the furnace gases from the interior of the tubes 18 and are securely supported in the alined holes 23 and 23ª while permitting the tube to freely expand and contract to reduce damage thereto. For this purpose, one end 22 of each tube projects out of the chamber 11 through the hole 23 in one side wall while the other end 24 extends into the hole 23ª, which is closed at its outer end, for example by plugs 26 held in place by a cover plate 27, to form an inwardly opening recess 25, the tube end 24 terminating short of the outer end of the recess. To seal the heating element 19 from the gaseous atmosphere of the furnace chamber 11 thereby reducing the rate of deterioration of the heating element, the end 24 of each tube is closed, although the other end outside the chamber is open to permit the lead wires 21 guided by insulated supports 28 to extend therethrough to provide terminals.

To maintain the heater 17 in its proper position, the closed end 24 of the tube 18 rests on the defining surface of the recess 25 and the open end 22 is secured to its associated side wall 15 by a plate 29 which is rigidly mounted on the wall by a retainer ring 30 and suitable screws 36 to hold the tube coaxially with the hole 23. With this construction, the tube is securely supported while at the same time, the tube may freely expand and contract with none of the expansion and contraction stresses in the furnace walls being transmitted to it, since the closed tube end 24 may slide toward and away from the outer end of the recess. Thus, danger of damaging the tubes is minimized. The outer periphery of the tube end 24 may engage a suitable support 31 preferably formed with a curved surface 32 thereon facing inwardly from the defining surface of the recess.

Since sliding of the closed end 24 of the tube 18 compensates for expansion and contraction and since the open end 22 is fixed to a side wall 15, the hole 23 may be sealed about the open end. To seal the hole, a gasket 34 is disposed around the tube 18 between the wall 15 and the sealing plate 29 and a sealing ring 35 is placed between the plate and the retainer ring 30, the entire sealing assembly being firmly secured together and to the wall by the screws 36. Such sealing also prevents the entrance of furnace gases into the tube through the open end thereof and completely separates the heating element 19 from the chamber. Thus, the furnace chamber is effectively sealed from the outside atmosphere and from the interior of the tube but, at the same time, the tube is free to shift relative to the side walls 15 during expansion and contraction of the furnace elements.

It will be apparent that by constructing the tube with one end 24 closed and the other end 22 open but sealed from the chamber 11, the gaseous atmosphere of the furnace is excluded from the interior of the tube 18 and therefore does not come in contact with the heating element 19.

Since the closed end of each tube extends into the recess 25 short of the outer end thereof and rests on the curved surface 32 of the support 31, the tube is free to slide relative to the side walls during expansion and contraction of the tube and the walls. By making the closed end free to slide, the open end may be fixed to one of the side walls thereby securely mounting the heater and permitting the hole 23 to be sealed around the tube.

I claim as my invention:

Heat apparatus having, in combination, means defining a chamber to be heated and including a pair of laterally spaced upright walls, a first one of said walls having means defining a recess opening inwardly into said chamber and closed at its outer end, and the second one of said walls having a hole therethrough alined with said recess, a tube substantially smaller in external dimension than said hole and said recess, said tube spanning said walls and having an open end extending through said hole and secured to said second wall and a closed end extending into said recess short of the end thereof to rest on the defining surface of said recess whereby to permit free expansion and contraction of the tube by movement of said closed tube and toward and away from said outer end of said recess, means to seal said hole around said tube, an electrical resistance heating element disposed within said tube intermediate the ends thereof, and a pair of conductors connected to said resistance and extending through said open tube end to provide terminals disposed on the outside of said chamber.

HAROLD N. IPSEN.

References Cited in the file of this patent

UNITED STATES PATENTS

| Number | Name | Date |
| --- | --- | --- |
| Re. 18,420 | Shaw | Apr. 12, 1932 |
| 1,463,513 | Lee | July 31, 1923 |
| 1,555,292 | Keene | Sept. 29, 1925 |
| 1,671,794 | Summey | May 29, 1928 |
| 1,675,226 | Burdick | Sept. 25, 1928 |